United States Patent [19] [11] 3,933,512
Heintzelman et al. [45] Jan. 20, 1976

[54] CARBON PAPER INKS CONTAINING WAX-ANHYDRIDE COMPOUNDS

[75] Inventors: William J. Heintzelman; Michael I. Naiman, both of St. Louis, Mo.

[73] Assignee: Petrolite Corporation, St. Louis, Mo.

[22] Filed: Dec. 22, 1972

[21] Appl. No.: 317,524

Related U.S. Application Data

[60] Continuation of Ser. No. 64,571, Aug. 17, 1970, abandoned, which is a division of Ser. No. 607,877, Jan. 9, 1967, Pat. No. 3,590,076, which is a continuation-in-part of Ser. No. 527,075, Feb. 14, 1966, abandoned.

[52] U.S. Cl. ............... 106/22; 106/23; 106/31; 106/32
[51] Int. Cl.² .......................................... C09D 11/12
[58] Field of Search ............ 106/22, 23, 10, 31, 32; 260/404.5, 404.8, 325.5, 485, 28.5 R, 247.2, 326.3, 326.5, 346.8, 448.2, 479, 534, 561, 562

[56] References Cited
UNITED STATES PATENTS

| | | | |
|---|---|---|---|
| 2,426,248 | 7/1944 | Sugarman | 106/23 |
| 2,589,306 | 3/1948 | Steiner | 106/22 |
| 2,776,895 | 10/1952 | Biser | 106/30 |
| 2,890,124 | 11/1956 | Mange | 106/23 |
| 2,890,125 | 11/1956 | Mange | 106/23 |
| 3,163,548 | 5/1961 | Stark | 106/31 |
| 3,165,484 | 3/1960 | Broadhead | 260/28 |
| 3,172,892 | 3/1959 | Le Suer | 260/326.5 |
| 3,214,282 | 5/1963 | McGee | 106/31 |
| 3,216,936 | 3/1964 | Le Suer | 252/32.7 |
| 3,381,022 | 7/1966 | Le Suer | 260/404.8 |

*Primary Examiner*—Lorenzo B. Hayes
*Attorney, Agent, or Firm*—Sidney B. Ring; Hyman F. Glass

[57] ABSTRACT

Wax-anhydride compounds and derivatives thereof, including amides, esters, etc. of such wax-anhydride compounds, employed in carbon paper inks.

11 Claims, No Drawings

CARBON PAPER INKS CONTAINING WAX-ANHYDRIDE COMPOUNDS

This Application is a continuation of Ser. No. 64,571 filed Aug. 17, 1970 which Application only is now abandoned and which was a Division of Ser. No. 607,877, filed Jan. 9, 1967, now U.S. Pat. No. 3,590,076, which is a continuation-in-part of application Ser. No. 527,075, filed Feb. 14, 1966, now abandoned.

This Application was copending with application Ser. No. 64,570, filed on Aug. 17, 1970, which application only is now abandoned, and is copending with application Ser. No. 107,569, filed on Jan. 18, 1971, and is also copending with Application Ser. No. 317,537, filed on Dec. 22, 1972. Said application Ser. No. 317,537 is a continuation of said application Ser. No. 64,570 and was copending therewith.

This invention relates to wax-anhydrides, equivalents thereof, derivatives thereof, processes by which they are prepared, and uses therefor.

These are illustrated by the following formulae where R is the wax moiety:

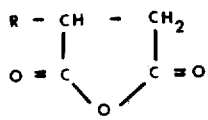

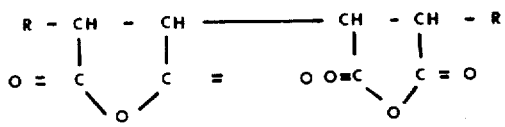

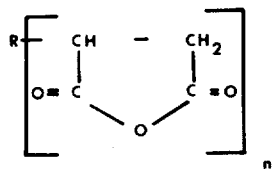

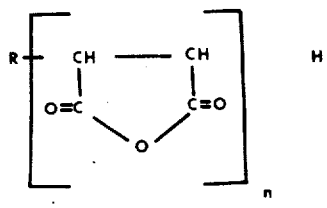

where $n$ is, for example 1 – 5, or even 25 or more in certain instances.

The wax-maleic compounds may also contain one or more of the above type units.

Stated another way, the wax molecule may have one or more maleic units attached thereto; said maleic units, which may be attached to one or more positions on the wax molecule, may be attached directly to the wax molecule or to one or more other maleic molecules.

In addition, derivatives thereof can also be prepared, for example esters, amides, ester-amides, imides, salts, etc. and poly-derivatives thereof, such as polyesters, polyamines, poly-salts, etc. Salts may be prepared from any of the above compounds which contain acidic or basic groups.

The term "wax-maleic compound" relates to the reaction of wax or a wax substitute with maleic anhydride, or equivalents or derivatives thereof. It also includes derivatives of the wax-maleic reaction.

The term "maleic compound" relates to maleic anhydride, maleic acid, maleic type anhydrides or acids and derivatives thereof.

Any suitable wax or wax substitute can be employed in preparing the wax anhydride. These include microcrystalline waxes, such as plastic and tank bottom derived microcrystalline waxes, solvent extracted microcrystalline waxes, etc., wax substitutes such as Fischer-Tropsch Wax, polyalkylenes such as polyethylene, polypropylene, and blends thereof, etc.

The preferred type of hydrocarbon waxes employed are those having a melting point of about 150° – 270°F. but preferably about 150° – 220°F. and a penetration as defined by ASTM Test Method D5-25 of from about 0 + to about 50, for example 0 + to about 30, but preferably 0 + to about 10 with an optimum of 0 + to about 5. These are obtained using 100 g. total weight for 3 seconds at 66°F. Waxes found within this range are microcrystalline wax, Fischer-Tropsch wax, certain of the polyalkylenes such as polyethylenes, etc. In general, these waxes have an average of over about 40 carbons, but preferably over about 45 carbons per molecule, such as from 50 – 75 or 100 or more. Where the waxes are of a lower molecular weight, they should be blended with a higher molecular weight material to give this average.

All of these waxes are well known. For example they are described in U.S. Pat. No. 2,890,125, which is by reference incorporated into the present application.

A unique class of polyethylenes which can be employed in this invention are those prepared by employing a catalyst which is an organolithium compound with a chelating tertiary amine, such as described for example in U.S. Pat. No. 3,206,519 and in the Journal of Organic Chemistry 29, 2928 (1964).

Because of its commercial importance, maleic anhydride is employed to illustrate this invention. Examples of other acids or anhydrides which may be reacted include citraconic acid, ethylmaleic acid, glutaconic acid, itaconic acid, methylitaconic acid, etc. The term "wax-maleic compound" and "maleic compound" includes these acids, anhydrides and derivatives.

Although the wax-maleic compounds can be prepared by any suitable method, we have prepared these compositions by reacting wax with maleic anhydride under free radical forming conditions. In one embodiment, wax, maleic anhydride and a peroxide are reacted at a temperature sufficiently high to promote free radical formation. Since heat promotes free radical formation, a temperature sufficiently high to promote the decomposition of the peroxide, without causing decomposition of reactants and products, is employed.

Depending on the peroxide, temperatures of about 100° – 250°C., such as about 125° to 225°, for example about 150° to 215°, but preferably about 170° to 200°, are employed. The temperature should be sufficiently high to keep all reactants in solution or in a molten state.

In the case of di-tert-butyl peroxide the best yields are obtained in the ranges of about 100° to 250°C., but preferably about 170° to 200°C.

Reaction times will depend on various factors such as for example on the particular reactants, reaction conditions, etc. A reaction time sufficient to effect the desired degree of reaction completion is employed. Ordinarily, reaction times of from about 0.5 to 6 hours, such as about 1 to 5 hours, for example about 1.5 to 4.5 hours, but preferably about 2 to 4 hours are employed. Shorter or longer times may be employed to push the reaction to the desired degree of completion depending on various factors such as reactants, conditions, peroxides, etc.

Any suitable free-radical producing agent capable of forming reactive sites can be employed. These include peroxides, hydroperoxides, etc., for example benzoyl peroxide, acetyl peroxide, 2,4-dichlorobenzoyl peroxide, tert-butyl peroxide, tert-butyl hydroperoxide, methyl benzyl hydroperoxide, cumene hydroperoxide, peracetic acid, tert-butylpermaleic acid, lauryl peroxide, methyl ethyl ketone peroxide, dicumyl peroxide, di-tert-butyl diperphthalate, tert-butyl peracetate, and the like.

Other sources of free radicals besides peroxides can also be employed, for example high energy ionizing irradiation, etc., cobalt in conjunction with hydroperoxides, inorganic peroxy compounds such as persulfates, hydrogen peroxide, etc., azo compounds of the general formula R—N=N—R such as azobenzene, azomethane, azobisisobutyronitrile, etc., acyl-aryl nitrosoamides such as nitrosoanilide, etc.

The wax anhydrides can be prepared by the process described in U.S. Pat. No. 3,030,387 which is by reference incorporated into this application. This application is illustrated by claim 9 which states:

"A process for the preparation of alkyl hydrocarbon and cycloalkyl hydrocarbon substituted succinic acid anhydrides which comprises reacting one mole of maleic anhydride with more than one mole of hydrocarbon selected from the group consisting of alkyl and cycloalkyl hydrocarbons of from 6 to 32 carbon atoms at a temperature above 100°C. and in the presence of a catalytic amount of di-tertiary-butyl peroxide."

The hydrocarbons employed in U.S. Pat. No. 3,030,387 are liquids and soft solids and therefore do not yield the improved products of this invention. In contrast to hydrocarbons employed in this invention are hard solids having high melting points and low penetrations.

All of the specific examples in U.S. Pat. No. 3,030,387 describe reactions carried out with a large excess of hydrocarbon in a closed vessel. In preparing the wax-anhydrides of the present invention substantially equimolar amounts or slight excesses or more of hydrocarbons can be employed by adding maleic anhydride to the hydrocarbon at atmospheric pressure under free radical conditions.

In one embodiment maleic anhydride and the peroxide, preferably as a solution, are added to molten well-stirred wax and the reaction allowed to react to completion. The product is precipitated by pouring into a liquid in which the desired product is insoluble, and the by-products are soluble, such as methanol, and the wax separated therefrom by any suitable means such as by filtration, etc. Thereafter the product is washed with methanol and collected by filtration.

In another embodiment, the maleic half-ester is converted to the anhydride in situ.

The following examples are presented by way of illustration and not of limitation:

EXAMPLE 7 (PROCESS I)

This example illustrates the formation of a wax-maleic anhydride adduct.

A solution of 16 g. of maleic anhydride and 3 g. of di-t-butyl peroxide in 100 ml. of o-dichlorobenzene is added during two hours to 100 g. of Fischer Tropsch wax having a m.p. of 212°F. and a penetration of 4 stirred and heated at 185°C. The mixture is stirred for an additional two hours at 185°C., then successively cooled to 90°C. and slowly poured into 500 ml. of stirred methanol to precipitate the wax. The mixture is filtered and the filter cake is slurried in 500 ml. of hot methanol for one hour and then filtered. The washing operation is repeated and the final solid product is air dried for about fifteen hours. The product is melted and slabbed. The yield of adduct is 108 g. It had an acid number of 51 and a saponification number of 99.

EXAMPLE 8 (PROCESS II)

This example illustrates the preparation of a wax-maleic half-ester adduct which is converted in situ to the anhydride.

Isopropyl maleate is formed by adding sixty grams (one mole) of anhydrous isopropyl alcohol during 15 minutes to 98 g. (one mole) of stirred, molten (65°C.) maleic anhydride. The mixture is stirred for an additional 15 minutes and then cooled to ambient temperature.

A solution of 26 g. of isopropyl maleate and 3 g of di-t-butyl peroxide is added during two hours to 100 g. of Fischer Tropsch wax having a m.p. of 212°F. and a penetration of 4, rapidly stirred and heated at 185°C. under a nitrogen atmosphere. The mixture is stirred for an additional 0.5 hour at 185°C., then successively cooled to 120°C. and slowly poured into 500 ml of rapidly stirred methanol. The mixture is heated to reflux, stirred for one hour and filtered hot (55°C.). The filter cake is reslurried in 500 ml. of refluxing methanol for one hour and then filtered hot. The filter cake is melted in a 110°C. oven and then slabbed. The product has an acid number of 46 and a saponification number of 97.

Since other examples are similarly prepared, in order to save repetitive details, other examples are presented in the following Table I.

Table I

| | Initial Wax | | Penetration No. | Molar Ratio Maleic Anhydride to wax | Process Employed | Wax-Maleic Product Analyses | |
|---|---|---|---|---|---|---|---|
| Ex. | Type | M.P. | | | | Acid No. | Sap. No. |
| 1 | Microcrystalline M.W. 700 | 190–195°F. | 3 | 1.3 | I | 47 | 88 |
| 2 | " | " | " | 1.2 | I | 45 | 91 |
| 3 | " | " | " | 1.2 | I | 50 | 96 |
| 4 | " | " | " | 1.0 | II | 52 | 98 |
| 5 | " | 160–165°F. | " | 1.2 | II | 48 | 94 |
| 6 | " | " | " | 1.2 | II | 47 | 93 |
| 7 | Fischer Tropsch M.W. 800 | 212°F. | 4 | 1.3 | I | 51 | 99 |
| 8 | " | " | " | 1.3 | II | 46 | 97 |
| 9 | " | 202°F. | 1 | 1.0 | II | 48 | 95 |
| 10 | Polyethylene M.W. 1500 | 102°C. | 3 | 1.5 | I | 54 | 99 |
| 11 | Microcrystalline M.W. 700 | 190–195°F. | 3 | 1.0 | I | 46 | 92 |
| 12 | Polyethylene M.W. 1500 | 102°C. | 3 | 1.4 | II | 47 | 95 |

The molecular weights of the products of this invention can be increased by reacting the wax-maleic compound with polyfunctional compounds capable of reacting with maleic derived moiety in the form of the acid, ester, anhydride, etc. For example, by reacting with polyamines, polyols, etc., one is able to polymerize two or more wax-maleic units. These are illustrated by the following where R is the wax moiety and R' is the moiety of the polyfunctional compound.

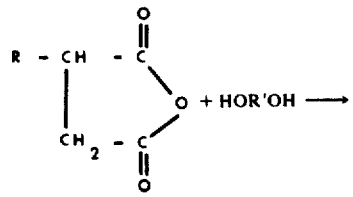

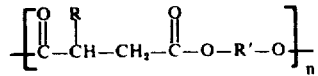

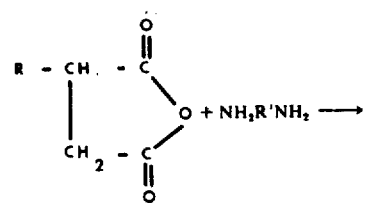

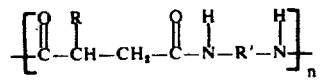

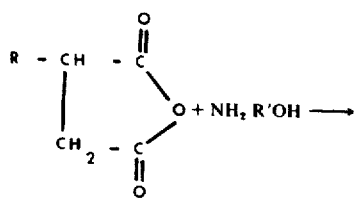

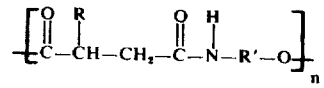

It will be noted that the above are true polymers having repetitive units.

In addition to forming a repetitive polymeric unit, the polyfunctional derivative may increase molecular weight by coupling with only one carboxylic group of each maleic unit to form a product having unreacted carboxylic acid groups to yield a product having a plurality of wax-maleic units bridged by the polyfunctional moiety. These are illustrated by the following:

In the case of the polyhydroxyl compound $n$ is preferable 2 – 4 but most preferably 3. All the hydroxyl groups are preferably coupled and R' is the moiety derived from the polyfunctional compound such as a hydrocarbon group, e.g. alkylene, arylene, etc.

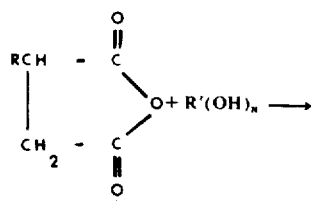

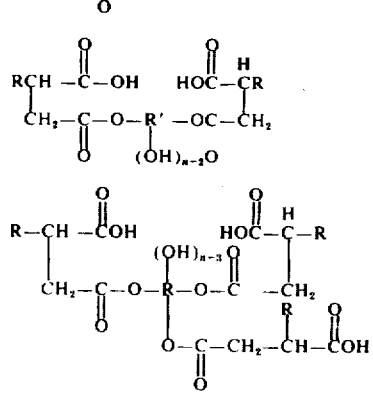

and so on, depending on the number of hydroxy groups in the polyol.

Analogous compositions may be prepared from polyamines. This results in the formation of amides instead of esters, and amino groups in place of hydroxy groups. In the case of polyamines, $n$ is preferably 2 – 3 and most preferably 2. All of the amino groups are preferably coupled.

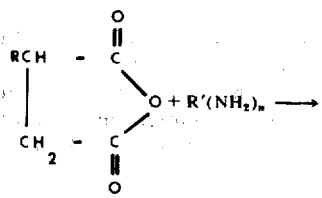

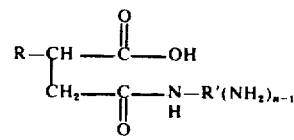

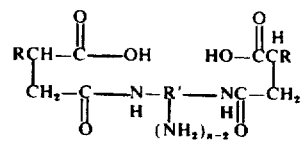

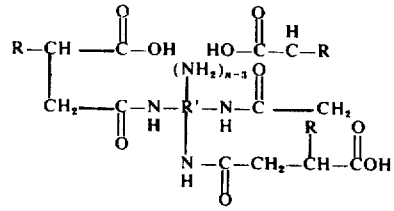

Polyamines may also be employed to couple wax-maleic units by forming polyimides on both imide and amides, for example, as follows:

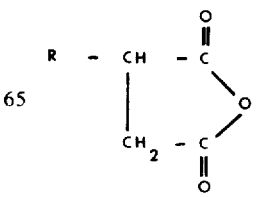 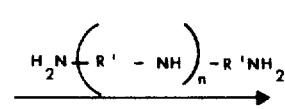

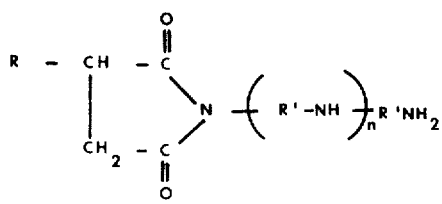

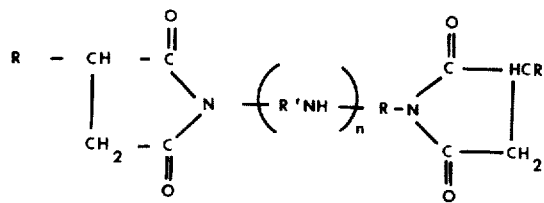

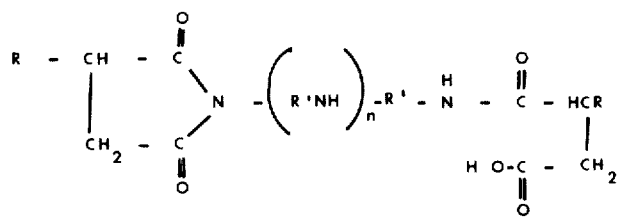

Corresponding compounds are also formed from hydroxyl amines as illustrated below. In the case of the hydroxyl amine, n is preferably 2 – 4, but most preferably 2. All of the hydroxyl and amino groups are preferably coupled.

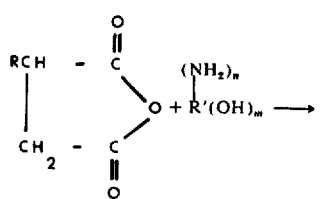

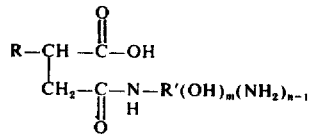

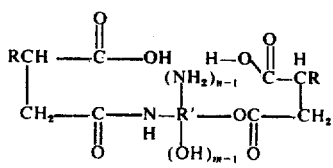

EXAMPLE 13 (PROCESS III)

This Example illustrates the conversion of the wax-maleic half ester to the wax-maleic anhydride, followed by coupling with a poly-functional compound to yield a triester:

A solution of 19 g of isopropyl maleate and 3 g of di-t-butyl peroxide is added during two hours to 100 g of Fischer Tropsch wax stirred and heated at 120°C. under a nitrogen atmosphere. No solvent is employed in this example. The mixture is stirred for an additional 0.5 hour at 185°C. and then cooled to 115°C. During reaction the ester is converted to the wax-maleic anhydride in situ. Five grams of trimethylol propane is then added to the stirred wax-maleic adduct heated at 115°C. The mixture is stirred for three hours at 115°C. and then slabbed.

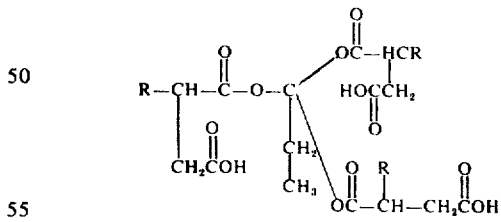

EXAMPLE 18

The process of Example 13 was repeated except that 2 grams of ethylene diamine was employed in place of trimethylol propane. This example 18 illustrates coupling with polyamines to yield a product of the formula

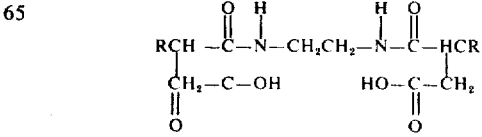

By further heating one may form the polyimide

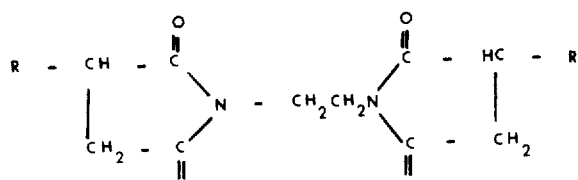

or the imide-amide

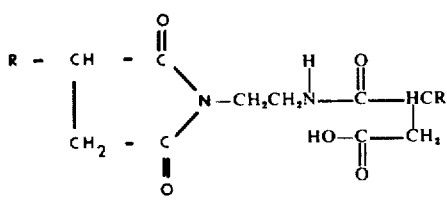

EXAMPLE 25

One hundred grams of the wax-maleic compound of Example 8 was heated at 150°C. for four hours to convert the material to the anhydride. The anhydride derivative is heated and stirred at 120°C. and 1% ethylene diamine based on wax is added. Heating and stirring is continued for an additional hour and then cooled to give a light tan, hard product, having a formula similar in structure to that of Example 18.

EXAMPLE 26

The above process was repeated except that tetraethylene pentamine was employed. The reaction mixture was heated to 120°C. for a period of about one hour, after which a reduced pressure of 200 mm was employed. The product was primarily the imide.

Since other examples are similarly prepared, in order to save repetitive details, other examples are presented in the following Table II.

TABLE II

| Ex. | Initial Wax | Mole Ratio Maleic/Wax | Coupling Agent, % (wax basis) |
|---|---|---|---|
| 13 | Fischer Tropsch MW 800 | 0.9 | Trimethylol propane, 5 |
| 14 | Fischer Tropsch HW 800 | 0.9 | Polyethylene glycol — Mol. wt. 600, 6 |
| 15 | Fischer Tropsch MW 800 | 0.9 | Ethylene glycol, 3.5 |
| 16 | 95% Fischer Tropsch MW 800 5% Polyethylene Mol. wt. 2000 | 0.9 | Trimethylol propane, 5 |
| 17 | Fischer Tropsch MW 800 | 0.9 | Glycerol, 4 |
| 18 | Fischer Tropsch MW 800 | 0.9 | Ethylene diamine, 2 |
| 19 | Fischer Tropsch MW 800 | 0.9 | Ethanolamine, 1.5 |
| 20 | Fischer Tropsch MW 800 | 0.9 | m-phenylene diamine, 2 |
| 21 | Microcrystalline Wax MW 700 | 0.9 | Trimethylol propane, 5 |
| 22 | Polyethylene MW 2000 | 0.9 | Trimethylol propane, 5 |
| 23 | Polyethylene MW 2000 | 0.9 | Ethylene diamine, 2 |
| 24 | Microcrystalline Wax MW 700 | 0.9 | m-phenylene diamine, 2 |
| 25 | Fischer Tropsch MW 700 (Ex.8) | 1.3 | Ethylene diamine, 1 |
| 26 | Fischer Tropsch MW 700 (Ex.8) | 1.3 | Tetraethylene Pentamine, 1 |

The above waxes have the following properties:
Fischer Tropsch mp 212°F., penetration 4
Polyethylene mp 102°C., penetration 3
Microcrystalline wax mp 190–5°F., penetration 3

The percent of polyfunctional coupling agent is weight percent based on initial wax.

A wide variety of polyalcohols may be employed as coupling agents. These include glycols and other polyols.

The glycols which may be employed herein can vary widely. In general, they are the glycols conventionally employed in preparing polyesters. Suitable examples include the following: alkylene glycols of the formula $H(OA)_nOH$ where n is for example 1 – 10 or higher and A is alkylene: ethylene, propylene, butylene, etc., for example ethylene glycol, diethylene glycol, propylene glycol, dipropylene glycol, tripropylene glycol, triethylene glycol, butylene glycol, tetramethylene glycol, neopentyl glycol, 2-methyl-1,3-pentanediol, 1,5-pentanediol, hexamethylene glycol, etc.

The polyols used herein can be widely varied and are those containing at least three esterifiable hydroxyl groups. In general, these are the polyhydric alcohols conventionally employed in preparing polyesters. Illustrative examples of such alcohols are glycerol, polyglycerol, pentaerythritol, mannitol, trimethylolpropane, trimethylolethane, 1,2,6-hexanetriol, poly-pentaerythritol, polyallyl alcohol, polymethallylalcohol, polyols formed by the condensation of bisphenols with epichlorohydrin, and the like.

In addition to the aliphatic glycols and/or polyols, one may also employ aromatic glycols and polyols including those of the phenolic type, for example those of the formula HO-Ⓐ-OH when Ⓐ is an aromatic containing radical for example

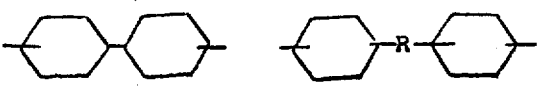

where R is for example, hydrocarbon, amino, amide, ester, oxygen, silicon, ketone, phosphorus, sulfur, sulfone, sulfoxide, etc. These aromatic groups may also be substituted, for example, as follows:

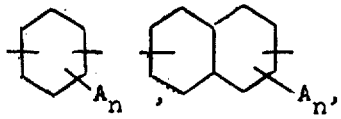

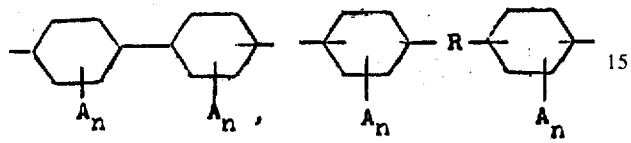

where A is a substituted group for example, alkyl, alkoxy, halo, nitro, etc. and $n$ is a number, for example, 0 – 4 inclusive. Also included are aromatic containing glycols and polyols containing aliphatic groups between the aromatic group and the hydroxy group for example:

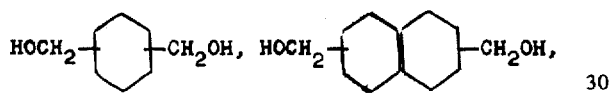

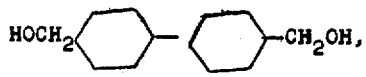

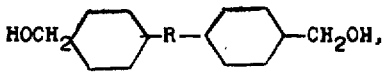

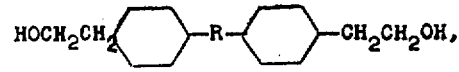

etc., where R has the same meaning as above.

The aromatic groups in the above polyol and glycol may also be in the reduced or partially reduced form. A wide variety of polyamines can also be employed as coupling agents.

The polyamines employed include those of the following formula:

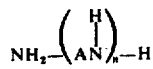

where $n$ is for example 1 – 8 or greater, where A is a divalent radical, for example straight or branched

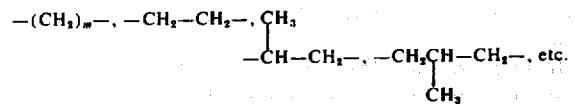

and m is for example 2 – 10 or greater. These include the following:

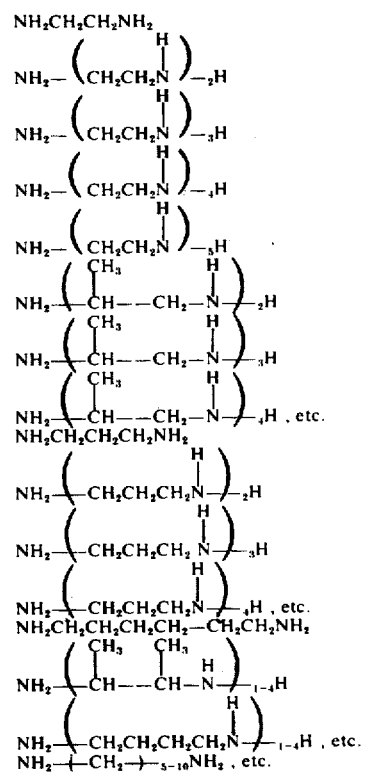

Other examples include the following alkylated polyamines for example of the formula

where the R's are H or a substituted group, such as cycloalkyl, alkyl, alkenyl, alkynyl, aryl, etc. The preferable type is of the formula

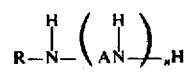

(R is straight chain or branch) Examples include the following:

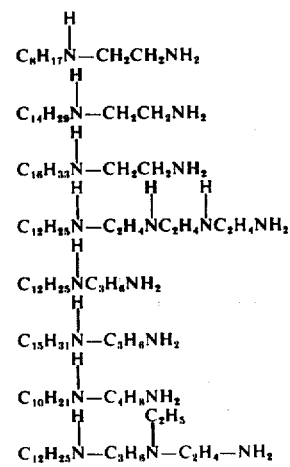

Other suitable amines are exemplified by:

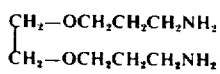

Aromatic polyamines can also be employed, for example:

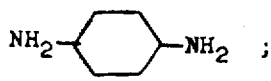

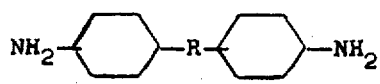

where R is O, S,

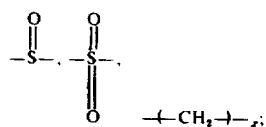, 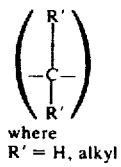, 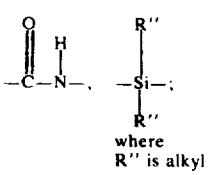

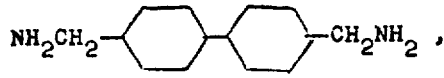

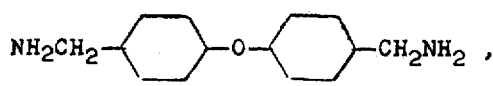

etc. or substituted derivatives thereof for example, alkyl, alkoxy, halo, etc. derivatives.

Thus, any polyamine capable of reaction, whether aliphatic, cyclo-aliphatic, aromatic, heterocyclic, etc., can be employed.

In addition, one may employ polyfunctional compounds having different reacting groups, for example both alcohol and amino groups such as alkanol amines, aromatic hydroxy amines, etc.

$(NH_2)_nA - (OH)_m$
such as where A is
1. $(-CH_2-)_x$ such as where x is 1 - 10 or greater,

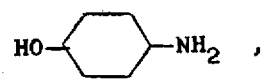

substituted derivatives thereof, etc.

3. cycloaliphatic, etc.
Typical examples include alkanol amines, ethanol amine, propanol amine, butanol amine, decanol amine, etc.

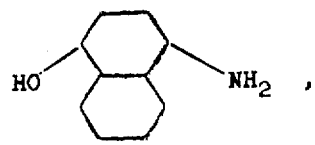

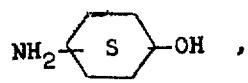

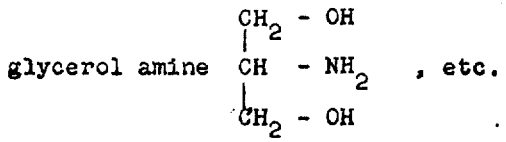

glycerol amine
$$\begin{array}{l}CH_2 - OH \\ CH - NH_2 \\ CH_2 - OH\end{array}$$ , etc.

In addition to the formation of polymers and coupled derivatives by reacting the wax-maleic compound with polyfunctional derivatives such as polyalcohols, polyamines, etc., to form amides, esters, esteramides, polyimides, polyimide amides, etc., other derivatives can also be formed including salts, etc.

In addition the wax-maleic compounds can be reacted with monofunctional derivatives to form corresponding esters, amides, imides, salts, etc.

For example, the wax maleic compound of this invention can be reacted with ammonia or amines to yield salts, amides, imides or combinations of these groups. In the case of monoamines, these include acylatable amines of the formula

where R is a substituted group and R' is hydrogen or a substituted group. Examples of R and R' include alkyl groups such as methyl, ethyl, propyl, butyl, amyl, hexyl, etc., including both straight and branch chain compounds, of the $C_nH_{2n+1}$ series; cycloalkyl groups such as cyclohexyl, etc.; alkenyl, alkadienyl; aryl groups, such as phenyl, etc.

In addition, even though a polyamine may be reacted, it is possible to control the reaction so that only one maleic moiety is reacted, for example to yield

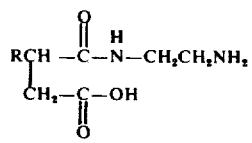

(probably in salt form),

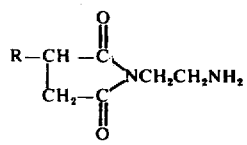

The following illustrates the reaction of wax anhydrides with mono amines and ammonia.

EXAMPLE A

One hundred grams of the wax-maleic compound of Example 8 was heated at 150°C. for four hours to convert the material to the anhydride. The anhydride derivative is heated and stirred at 120°C. and 2% aniline based on wax is added. Heating and stirring is continued for an additional hour and then cooled to give a light tan, hard product.

EXAMPLE B

The above process was repeated except that cyclohexylamine was employed. The reaction mixture was heated to 120°C. for a period of about one hour, after which a reduced pressure of 200 mm was employed. The product was primarily the imide.

EXAMPLE C

One hundred grams of the wax-maleic derivative of Example 8 was heated at 150°C. for four hours to convert the material to the corresponding anhydride derivative. Heating was continued at 150°C. and a slow stream of ammonia was blown through the wax for one hour. Upon cooling the product solidified to a light brown hard solid, which was useful as a carbon paper wax.

EXAMPLE D

The process of Example A was repeated except that 3% of lauryl amine was employed — $R-NH_2$ where R is lauryl to yield the monoamide.

Esters can also be prepared from monoalcohol R'OH where R' is alkyl such as methyl, ethyl, propyl, butyl, pentyl, hexyl, etc., including both straight and branch chain compounds, of the $C_nH_{2n+1}$ series, cycloalkyl such as cyclohexyl, etc; alkenyl, alkadienyl; aryl groups, such as phenyl, etc. These are illustrated by the following equations:

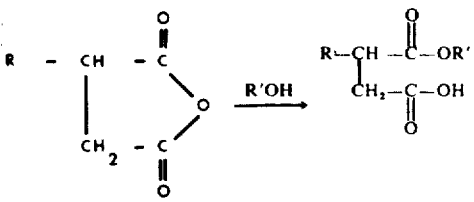

The formulas presented herein are idealized structures and are presented to illustrate the probable structures of the products. Variations in these structures may occur to yield other products or mixtures thereof. Thus, we do not wish to be bound by such structures — rather they are used to present probable structures when the components are reacted. For example, where the wax-maleic formula is specified as

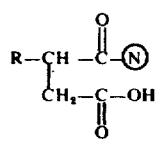

it also includes

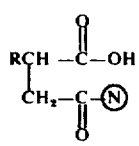

, etc.
Where the formula

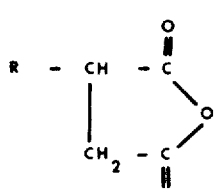

or a related formula is employed, it ideally represents a wax-maleic compound. Ⓝ in the above relates to the amino-derived moiety.

USE IN CARBON PAPER INKS

This section deals with the utilization of the wax-maleic compounds of this invention in carbon paper inks. There are several articles, patents, and other published literature which discuss various types of carbon paper, particularly in regard to formulation of the various ingredients, test procedures, utilization of various waxes, etc. See, for example, U.S. Pat. No. 2,426,248, dated Aug. 26, 1947, to Sugarman; Chapter 12 entitled "Carbon Paper and Other Duplicating Papers" by R. R. Wissinger in the book edited by R. H. Mosher entitled "Specialty Papers", published by the Chemical Publishing Co., New York in 1950; the paper on the "Rheology of Carbon Paper Inks" by E. S. Gale and B. J. Staneslow in the American Ink Maker issue of December 1950; the paper on "Converting of Carbon Papers" by F. M. McFarland in the Paper Trade Journal, Volume 137, pages 230-237 (1953); and the book Commercial Waxes by H. Bennett, pages 368, 377 and 429–431, published by Chemical Publishing Co., New York, in 1944.

We have particularly found that the wax-maleic compounds which have been coupled with polyamines such as for example diamines yield superior carbon paper inks. Thus, we have discovered that coupled compounds of the formula

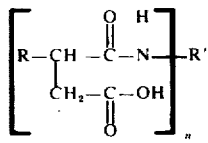

yield superior inks, where R is the wax moiety, and R' is the polyamine derived moiety preferably hydrocarbon and most preferably aliphatic or aromatic, and n is at least 2, such as 2 – 4 or greater, but preferably 2.

Although the uncoupled wax-maleic compounds yield excellent inks, the coupled derivatives are superior, particularly in regard to oil retention penetration.

There are many different types of carbon paper and related materials in use today. The three most widely used types of carbon paper are the one-time carbon which is used once and then thrown away, the pencil carbon which may also be used once, or may be used many times, and the typewriter carbon. The one-time carbon is the most widely used type of carbon paper and it finds wide application in business and multiple forms and other applications. In the production of one-time carbon paper, cost is all important. On the other hand, for typewriter carbons, quality rather than cost is important, and for pencil carbons, cost and quality are intermediate in importance.

The carbon paper ink may be viewed simply as a mixture containing a wax, an oil, a pigment and a dye. The oil serves as the vehicle and the pigment and dye give the color and some of the body. Most of the desirable characteristics in the finished ink must be supplied by the wax and these will be described later. Other materials may also be used in carbon paper to give it certain properties. For example, petrolatum may be used as part or all of the vehicle to impart certain properties such as plasticity and toughness, and paraffin wax may be used as a substitute for part of the wax to give a cheaper formulation. One of the unique properties of many of the wax-maleic compounds of this invention is that they are able to carry a lot of paraffin wax into the ink formulation without detracting greatly from the desirable characteristics required. In this respect, these products are comparable to Carnauba and Ouricury and superior to Montan. Other materials may be used in carbon paper inks such as clay to cheapen the formula, oleic acid which acts as a dye solubilizer, rubbers to give toughness, dispersing agents, etc.

The consistency and other properties of the ink can be varied to a certain degree by the choice of the oil which is used. For example, various oils ranging from a relatively light mineral oil (100 SUS at 100°F.) up to heavy oils and petrolaums may be used. These oils and petrolatums may be colorless or range in color up to black. The darker colored materials are generally better dispersants for the pigment.

There are numerous pigments which may be used in typical formulations. The most common pigment is carbon black and this comes in numerous grades such as channel blacks, furnace blacks, etc., and each of these grades come in many modifications. The channel blacks are, in general, the most desirable as far as quality is concerned, but on the other hand, they are also the most expensive. The high-grade channel blacks have an oxygenated surface which aids in its dispersion and which can absorb the dye and other materials. As one goes down the scale of carbon blacks, lesser amounts of this very desirable oxygenated surface are encountered. Blue pigments may also be used, such as Milori Blue, and others, as can many other blue pigments. Numerous other colored pigments may also be used as described in the literature.

Many dyes are commonly employed in carbon paper inks. The common ones are Methyl Violet, Nigrosine, Victoria Blue, etc., and salts of these materials. It is advantageous to use a dye which is soluble in the wax, but if this is impossible, a solubilizer must be used. One of the advantages of using the wax-maleic compounds of this invention is that the dye is soluble in the wax and no solubilizer is necessary. In general, any solubilizer, which is used will detract from the qualities of the finished ink, i.e., will cause dye bleed, soften the ink, cause frosting, etc. In some instances it is possible to completely eliminate the dye, but this is the exception rather than the rule.

A wax to be useful for this purpose, must have many specific properties when used in small concentration in the finished ink; for example, in concentrations of from 8% to 12% in one-time carbon paper inks, or in higher percentages, up to 30% or 40%, in typewriter carbons.

It seems that most of the desirable characteristics required in a one-time carbon paper ink must be imparted by small percentages of wax. This is particularly true of one-time carbon paper inks. Since these waxes must have so many specific characteristics, which seem to be specific for only Carnauba or Ouricury wax, it is not surprising that these two natural waxes are widely used as one of the components of carbon paper inks and that there are no synthetic materials which can completely replace these materials in the percentages in which they are used. It was quite surprising that many of the products of this invention have a combination of all the desirable characteristics required and that the materials served as complete replacements for the expensive natural waxes, Carnauba and Ouricury in many applications and in some respects these waxes are actually superior to the two natural waxes.

To be useful for carbon paper inks a wax must be able to dissolve the dye, such as methyl violet, Victoria blue, nigrosine, etc., preferably without the addition of a solubilizer, such as oleic acid. In this respect, the waxes of this invention are much superior to the natural waxes Carnauba, Ouricury, and Montan which are almost universally used in one-time carbons. A wax must also produce good flow in a one-time carbon paper ink so that a thin uniform coating can be obtained. To produce good flow, a wax should give an ink of low viscosity, no thixotropy and no yield value (be newtonian). The dispersion of the carbon black and the viscosity of the wax are the important variables which influence the flow of the finished ink. The ability of a wax to disperse carbon can be measured by the procedure described by Gale and Staneslow in the aforementioned article. If a wax gives B-type dispersion or better, at 6%, no flow difficulties would be expected. Also, in this respect, many of the products of this invention are equal to or superior to the natural waxes Ouricury, Carnauba and Montan.

A wax must also yield a finished ink which is hard and which will not bleed oil. These properties can be easily tested, at least to a certain degree, by determining the oil retention penetration and the oil retention of a wax oil blend. In this respect, the waxes of this invention show great value and are comparable, in some cases superior, to Carnauba, Ouricury and Montan which is a property which is often so hard to duplicate.

The following are formulations employing wax-maleic compositions of this invention for a one-time carbon of medium intensity:

A.

Carton Paper Ink 1

| Grams | Material |
| --- | --- |
| 12 | A product of this invention (Ex. 25) |
| 20 | Paraffin Wax (m.p. approx. 135°F.) |
| 17 | Carbon Black |
| 1 | Methyl Violet |
| 50 | Mineral Oil |

B. Same as A except that the product of Example 18 was employed, in place of Example 25.

The paraffin wax used is a high-melting-point paraffin and the oil is a 100-second oil at 100°F. The carbon black can be a channel black such as exemplified by Peerless Beads or a cheaper channel black such as Raven 15, manufactured by Columbian Carbon Company, or a furnace black as exemplified by Statex B-12 manufactured by Columbian Carbon Company.

The above formulations may be modified in several ways to give different intensities and grades of ink; for example clay can be substituted for some of the carbon black and oil to cheapen the formula without greatly impairing quality, and other variations in the proportions of wax may be made.

A similar one-time carbon paper formulation employing clay is as follows:

A.

Carbon Paper Ink 2

| Grams | Material |
| --- | --- |
| 12 | A product of this invention (Ex. C) |
| 25 | Paraffin Wax (m.p. approx. 135°F.) |
| 0.5 | Methyl Violet Base |
| 1 | Nigrosine |
| 18 | ASP-100 clay |
| 10 | Carbon Black |
| 17 | 300 Sec. Mineral Oil |
| 16.5 | Petrolatum |

B. The above example was repeated except that the product of Example 20 was employed, in place of Example C.

One type of carbon black which may be used is a channel black such as Peerless Beads or a cheaper channel black such as Raven 15 or comparable products, or mixtures of these. These waxes also find use in other types of carbon paper and ribbons such as pencil carbons, typewriter ribbons, etc. A typical one-time medium blue pencil carbon formulation is as follows:

A.

Carbon Paper Ink 3

| Grams | Material |
| --- | --- |
| 12 | A product of this invention (Ex. 25) |
| 25 | Paraffin Wax (m.p. approx. 135°F.) |
| 18 | ASP-100 clay |
| 20 | Milori blue |
| 13 | 300 sec. Mineral Oil |
| 12 | Petrolatum |

B. The above example was repeated except that the product of Example 18 was employed, in place of Example 25.

A typical typewriter formulation is as follows:

A.

Carbon Paper Ink 4

| Grams | Material |
| --- | --- |
| 25 | A product of this invention (Ex. C) |
| 18 | Carbon black ("Raven 15") |
| 1 | Methyl Violet |
| 10 | Paraffin Wax (m.p. approx. 135°F.) |
| 16 | 300 sec. Mineral Oil |

B. The above example was repeated except that the product of Example 20 was employed, in place of Example C.

As above, these formulations may be modified in many ways to obtain carbon paper ink to fit individual uses.

These inks may be prepared either in a ball mill or a three-roll mill by conventional procedures using temperatures of from approximately 190°F. to 220°F. Care must be taken when certain dyes are used not to exceed these temperatures; otherwise, the dye will decompose. These finished inks can be coated onto paper using a Mayer type coater or comparable equipment. Normally, it is best to apply approximately 2.5 lbs. of wax per ream for one-time carbons and higher quantities for typewriter carbons.

Among the properties which are highly desirable in carbon paper waxes are oil retention penetration and carbon dispersion. The properties are tested as follows:

Oil Retention Penetration Test: Twenty-five grams of wax on test and 25 g. of a 100 SUS mineral oil (i.e., Texaco Ink Oil No. 538) are placed in a 150 ml beaker which is covered by a watch glass and placed in an oven at 100°C. for two hours. Stir the sample with a glass rod, pour it into an aluminum foil dish (Fisher Scientific Company Cat. No. 8-732)resting on asbestos, and then cover with a 600 ml beaker. Allow the sample to stand for one hour at room temperature, then transfer to a water bath at 25.0°+ or − 0.2°C. and hold for 3–4 hours. Penetration values are then obtained on the top and bottom of the sample, and these values are averaged to give the oil retention penetration. Penetration values are determined under a test load of 100 g. for 5 seconds, and are reported to the nearest tenth of a millimeter. The penetration needle employed is similar to that described in ASTM test method D 1321-54T except that the length of taper is 23 mm. rather than 6.5 mm.

Carbon Dispersion Test: One to two and one-half grams (4-10%) of wax on test and 20.5-19.0 g. (82-76%) of a 100 SUS oil (i.e. Texaco Ink Oil No. 538) are heated with stirring at 95°–100°C. in a 500 ml round bottom flask until a solution is obtained. Add 3.5 g (14%) of a carbon black such as Kosmos 40 (United Carbon Company) and approximately 20 g. of 3 mm. diameter glass beads. Stir at 95°–100°C. for 30 minutes using a stirrer which scrapes the width of the flask. A drop of the prepared ink is then placed on a hot stage heated to 95°C., or on an adsorption cell through which a glycerol-water solution is circulated at 95°C. Place a cover glass over the sample, press with tweezers or small spatula to form a thin, semi-transparent film, then examine under a microscope at X200, both under stress and without stress. The inks are then classified as Type A (no structure under or without stress), type B (no structure under stress, structure without stress), type C (structure under or without stress), and type D (pigment not wetted). Type A is the best followed by types, B, C, and D. This test is well described in the paper on the "Rheology of Carbon Paper Inks" by E. S. Gale and B. J. Staneslow, published in the American Ink Maker issue of December, 1950.

The following amine reaction products prepared in the manner of Example 18 were tested for oil retention penetration at weight ratios of 50% wax-maleicamine product and 50% oil, according to the above method. The wax employed in each case was a Fischer Tropsch wax.

TABLE III

| Weight % Amine Based on Wax | Amine Employed in Fischer Tropsch-Maleic-Amine Reaction Product | 50/50 Reaction Product/Oil — Oil Retention Penetration |
| --- | --- | --- |
| 3 | Ethylene Diamine | 25 |
| 2 | Ethylene Diamine | 33 |
| 2.5 | Ethylene Diamine | 29 |
| 1.5 | Ethylene Diamine | 36 |
| 9 | Aniline | 60 |
| 6 | Ethylene Diamine | 43 |
| 6 | Ethanol Amine | 47 |
| 3 | Ethanol Amine | 43 |
| 4 | Diaminopropane | 31 |
| 3 | Diaminopropane | 33 |
| 8 | Morpholine | 40 |
| 6 | Morpholine | 47 |
| 4 | p-Phenylene Diamine | 45 |
| 3 | p-Phenylene Diamine | 43 |
| 6 | p-Phenylene Diamine | 37 |
| 5 | p-Phenylene Diamine | 37 |
| 4 | m-Phenylene Diamine | 37 |
| 3 | m-Phenylene Diamine | 33 |
| 6 | m-Phenylene Diamine | 36 |
| 5 | m-Phenylene Diamine | 36 |
| 4 | o-Phenylene Diamine | 67 |
| 3 | o-Phenylene Diamine | 64 |
| 6 | o-Phenylene Diamine | 66 |
| 5 | O-Phenylene Diamine | 66 |

Employing the above carbon dispersion test all of the above products were classified as Type B or better.

OTHER USES

This section deals with other uses for the wax-maleic compounds of this invention.

Because of their very desirable properties, particularly in reference to their excellent hardness, they are useful for blending with other materials to impart their favorable properties, for example; they may be blended in small concentrations with paraffinic type waxes to yield blends with improved hardness and increased melting point. One specific application in this line would be to blend 3 – 10% of the hard products described in this application with paraffin wax to yield a product with better blocking characteristics.

One of the important uses for these products is for various types of polishes; for instance, floor polish, shoe polish, furniture polish, and automobile polish.

A typical formulation in which these products have found use in the field of emulsion floor polishes is as follows:

| Grams | Floor Polish A<br>Material |
| --- | --- |
| 50 | The product of this invention (Ex. 7) |
| 50 | "Durez 219" |
| 10 | Oleic Acid |
| 6 | 2-amino-2-methyl-1-propanol |
| 4 | Borax |
| 830 | Water |

The first three ingredients in the above formulation are blended at temperature up to but not exceeding 350°F. The mixture is cooled to 210°F. with agitation. The 2-amino-2-methyl-1-propanol is added with stirring at 200° to 210°F. followed immediately by the borax in a saturated solution. The resulting mixture is heated with stirring at 200°F. to a maximum of 210°F. for five minutes and then the wax melt is slowly poured into water at 200°F. with rapid agitation. When the emulsion has smoothed out, 10–20% of a cold solution of leveling agent is added during agitation and cooled to room temperature. A leveling agent which may be used is a 12% ammoniacal shellac solution prepared by dissolving 102 g of refined dewaxed shellac in a solution of 26 g of 26°Be (28%) ammonia in 722 g. of water.

"Durez 219" is a terpene-phenolic, oil soluble, high melting, low viscosity, thermoplastic resin having a melting poilt (capillary) of 130°-136°C., an acid number of from 60 to 70, a specific gravity at 25°C. of 1.09 and a refractive index of 1.552. It is manufactured and supplied by the Durez Plastic and Chemicals Division of Hooker Electrochemical Co.

Many modifications of the above formulation can be made; for instance, the resin can be eliminated or other resins substituted for the above. Other waxes can be used in conjunction with the above or the products of the other examples in this invention can be used.

We have particularly found that the wax-maleic compounds which have been coupled with polyhydroxy compounds such as glycols and polyols yield superior emulsified wax polishes. Thus we have discovered that coupled compounds of the formula:

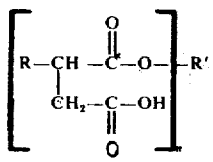

yield superior emulsified wax polishes where R is the wax moiety, R' is the polyhydroxyl derived moiety, preferably hydrocarbon and most preferably aliphatic, and n is at least 2, such as 2-6 or greater but preferably 3.

Although uncoupled wax-maleic compounds yield excellent emulsified waxes, the coupled derivatives are superior particularly in regard to their recoatability, i.e. the ability to apply an additional layer of emulsified wax without deleteriously effecting the layers of wax already applied.

FLOOR POLISH B

This is an example of a typical formulation of an emulsion floor polish in which the coupled wax-maleic compound is employed.

| Grams | Material |
|---|---|
| 25 | Product of Ex. 13 |
| 1 | Tributoxyethyl phosphate |
| 3 | Diethylamino ethanol |
| 200 | Water |

The first two components in the formulation are melted at 230°F. Diethylaminoethanol is added to the melt and the mixture is stirred and aged for five minutes and then added slowly to the water at 205°F. with rapid agitation. When the addition is completed the emulsion is cooled rapidly to ambient temperature.

These polishes, when spread on linoleum, asphalt tile, rubber tile, vinyl tile, etc. yields a film which when dried is very hard, scuff and abrasion-resistant, with a high gloss and with good water resistance. Polish B had superior recoatability.

The above Floor Polish B formulation was prepared with the following products — Example 14, 15, 16 and 17 to yield excellent polishes.

A good no-rub automobile polish and furniture polish can be prepared from the following formulations and procedures:

Automobile Polish

A.

| Grams | Materials |
|---|---|
| 3.0 | A product of this invention (Ex. 8) |
| 3.6 | Silicone (5000 cs. visc.) |
| 3.6 | Oleic Acid |
| 1.7 | Morpholine |
| 67.5 | Mineral Spirits (boiling point 275-325°F.) |
| 40.0 | Water |

B.

The above formulation was also prepared with the product of Example 13 in place of Example 8.

The wax, silicone and oleic acid are dissolved in the mineral spirits and an emulsion formed. A suitable 5000 cs. viscosity silicone would be Linde L-41 diethyl silicone oil sold by Linde Air Products Co., Division of Union Carbide and Carbon Corporation.

These last two formulas make good high-gloss polishes of the no-rub, quick-drying type. Most silicone polishes require thorough cleaning of the surface of application for best results. With clean surfaces the polish is spread smoothly, allowed to dry to a powdery film and the film wiped off, leaving a high gloss with no rubbing.

The ratio of silicone to wax should be maintained while the variation in the total solids (wax in silicone) is between four and ten per cent.

Following is a formulation for the manufacture of a shoe polish wax employing a wax of this invention:

Shoe Polish

A.

| Grams | Material |
|---|---|
| 12 | Paraffin Wax (131-133°F.) |
| 13 | A wax of this invention (Ex. 1) |
| 15 | Turpentine |
| 60 | Mineral Spirits |

B.

The above polish was also prepared with the product of Example 13 in place of Example 1.

The first two ingredients are melted together and to this blend the last two materials are added. After a solution is obtained, the polish is poured at a temperature just above the point in which the wax starts to separate. Depending upon the color of the finished product, any of several dyes may be used, the main criteria being that of solubility.

In any of these formulations, oftentimes other products from this invention other than those specifically mentioned may be used, but generally in these cases, slight modifications may become necessary. These modifications can be made without too much difficulty by those who are skilled in the art. The above formulations are very good starting points and these formulas can be altered or modified in any of many ways.

The above are examples of uses for the wax-maleic compounds of this invention. In addition, they can be used in place of, or in conjunction with, other waxes.

We claim

1. In a carbon paper ink comprising a mixture of

I. a vehicle oil,

II. a pigment,
III. a dye, the improvement comprising, in said mixture, an additive
IV. selected from the group consisting of A. a wax-maleic compound adduct reaction product of (i) maleic acid, maleic anhydride, citraconic acid, citraconic anhydride, ethylmaleic acid, ethylmaleic anhydride, glutaconic acid, glutaconic acid anhydride, itaconic acid, itaconic acid anhydride, methylitaconic acid, or methylitaconic acid anhydride and (ii) plastic microcrystalline wax, tank bottom microcrystalline wax, solvent extracted microcrystalling wax, Fischer-Tropsch wax, polyalkylene hydrocarbon wax or mixtures thereof, characterized by a melting point of at least about 150°F. and a penetration of less than about 50 (ASTM Test Method D5-25), the molar ratio of (i) to (ii) being from about 0.9 to about 1.5 and the reaction being carried out at substantially atmospheric pressure under free radical conditions, and
B. said wax-maleic compound adduct reaction product of A coupled with a polyfunctional compound selected from the group consisting of
1. a polyfunctional polyalcohol selected from the group consisting of ethylene glycol, diethylene glycol, propylene glycol, dipropylene glycol, tripropylene glycol, triethylene glycol, butylene glycol, polyethylene glycol having a molecular weight of about 600, tetramethylene glycol, neopentyl glycol, 2-methyl-1,3-pentanediol, 1,5-pentanediol, hexamethylene glycol, glycerol, polyglycerol, pentaerythritol, mannitol, trimethylolpropane, trimethylolethane, 1,2,6-hexanetriol, polypentaerythritol, polyallyl alcohol, polymethallyl alcohol,

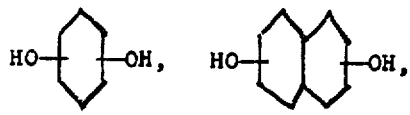

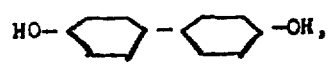

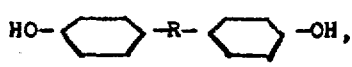

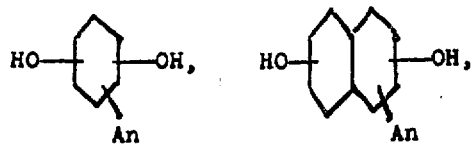

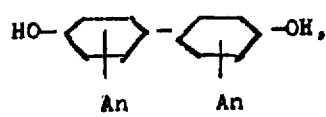

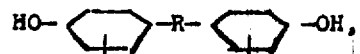

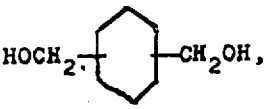

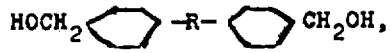

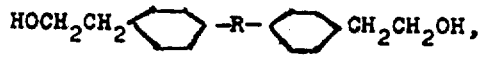

where R is hydrocarbon, amino, amide, ester, oxygen, silicon, ketone, phosphorus, sulfur, sulfone, or sulfoxide, A is alkyl, alkoxy, halo or nitro, and $n$ is 1–4, 2. a polyfunctional amine selected from the group consisting of a polyamine of the formula

where A is

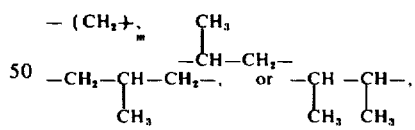

$m$ being 2–10 and $n$ being 1–8, $C_8H_{17}NH\text{-}CH_2CH_2NH_2$, $C_{14}H_{29}NH\text{-}CH_2CH_2NH_2$, $C_{16}H_{33}NHCH_2CH_2NH_2$, $C_{12}H_{25}NHC_2H_4NHC_2H_4NHC_2H_4NH_2$, $C_{12}H_{21}NHC_4H_8NH_2$,

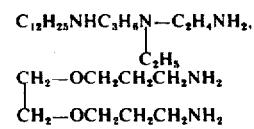

p-phenylene diamine, m-phenylene diamine, o-phenylene diamine,

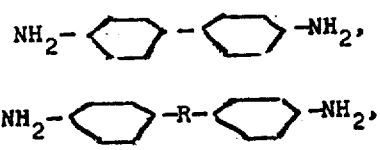

where R is O, S,

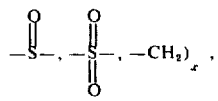

x being 1-4,

R' being H or alkyl,

or

R" being alkyl,

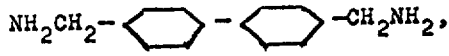

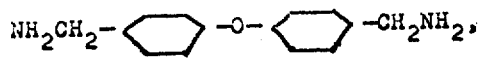

and morpholine, and 3. a polyfunctional alcohol-amine selected from the group consisting of $NH_2(CH_2)_x OH$, where $x$ is 1-10,

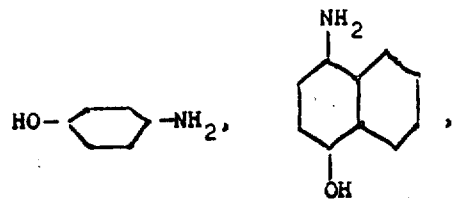

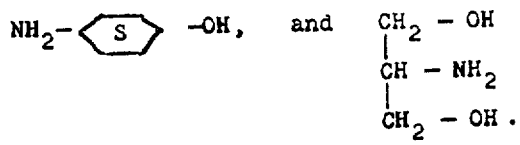

2. The carbon paper ink of claim 1 where said product contains a plastic microcrystalline wax, a tank bottom microcrystalline wax or a solvent extracted microcrystalline wax.

3. The carbon paper ink of claim 1 where said product IV. A.(ii) contains a Fischer-Tropsch wax.

4. The carbon paper ink of claim 1 where said product contains a polyalkylene hydrocarbon wax.

5. The carbon paper ink of claim 1 where said additive comprises said product with said polyfunctional compound.

6. The carbon paper ink of claim 5 where said compound is said polyfunctional alcohol.

7. The carbon paper ink of claim 5 where said compound is said polyfunctional amine.

8. The carbon paper ink of claim 5 where said compound is said polyfunctional alcohol-amine.

9. The carbon paper ink of claim 7 where said product contains Fischer-Tropsch wax.

10. The carbon paper ink of claim 9 where said product contains ethylene diamine.

11. The carbon paper ink of claim 9 where said product contains m-phenylene diamine.

* * * * *